United States Patent
Ishihara (10) Patent No.: US 11,288,419 B2
(45) Date of Patent: Mar. 29, 2022

(54) SIMULATION APPARATUS, SIMULATION METHOD, AND COMPUTER READABLE MEDIUM STORING PROGRAM

(71) Applicant: SUMITOMO HEAVY INDUSTRIES, LTD., Tokyo (JP)

(72) Inventor: Sadanori Ishihara, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 308 days.

(21) Appl. No.: 16/565,999

(22) Filed: Sep. 10, 2019

(65) Prior Publication Data

US 2020/0104439 A1    Apr. 2, 2020

(30) Foreign Application Priority Data

Oct. 1, 2018 (JP) .............................. JP2018-186520

(51) Int. Cl.
    *G06F 30/20*     (2020.01)
    *G06F 111/10*    (2020.01)

(52) U.S. Cl.
    CPC .......... *G06F 30/20* (2020.01); *G06F 2111/10* (2020.01)

(58) Field of Classification Search
    CPC .............................. G06F 30/20; G06F 2111/10
    USPC .......................................................... 703/2
    See application file for complete search history.

(56) References Cited

U.S. PATENT DOCUMENTS

| | | | | |
|---|---|---|---|---|
| 8,781,799 | B2* | 7/2014 | Ichishima | G16C 10/00 |
| | | | | 703/2 |
| 10,013,514 | B2* | 7/2018 | Hirose | G16C 10/00 |
| 2013/0013271 | A1* | 1/2013 | Aikawa | C04B 20/0076 |
| | | | | 703/2 |
| 2013/0149613 | A1* | 6/2013 | Yoshikawa | H01G 9/155 |
| | | | | 429/233 |
| 2016/0312037 | A1* | 10/2016 | Zhao | C08J 3/12 |
| 2016/0342772 | A1* | 11/2016 | Ichishima | G16C 10/00 |
| 2017/0017737 | A1* | 1/2017 | Hirose | G06F 30/20 |
| 2018/0107773 | A1* | 4/2018 | Fujisaki | G06F 30/23 |
| 2019/0065645 | A1* | 2/2019 | Maiti | G06F 30/23 |
| 2019/0311786 | A1* | 10/2019 | Kobayashi | G16C 10/00 |

(Continued)

OTHER PUBLICATIONS

Sakai et al. "Verification and validation of a coarse grain model of the DEM in a bubbling fluidized bed", Chemical Engineering Journal 244 (2014) 33-43 (Year: 2014).*

(Continued)

*Primary Examiner* — Iftekhar A Khan
(74) *Attorney, Agent, or Firm* — Michael Best & Friedrich LLP (57) ABSTRACT

A processing apparatus analyzes behavior of a granular material including a plurality of particles having different sizes based on a simulation condition input from an input apparatus. The processing apparatus obtains behavior of a coarse grained granular material based on a value of a parameter defining a particle diameter distribution of a granular material to be simulated and a value of a coarse graining coefficient which is a reference for coarse graining of the particles, which are input from the input apparatus. Further, the processing apparatus associates the behavior of the particles obtained by the simulation with the input value of the coarse graining coefficient and outputs the result to the output apparatus.

4 Claims, 11 Drawing Sheets

(56) References Cited

U.S. PATENT DOCUMENTS

2020/0089826 A1* 3/2020 Liu ........................ B33Y 50/00
2020/0342151 A1* 10/2020 Misawa ................. G06F 30/25

OTHER PUBLICATIONS

González-Tello et al. ("A modified Nukiyama-Tanasawa distribution function and a Rosin-Rammler model for the particle-size-distribution analysis", Powder Technology 186 (2008) 278-281) (Year: 2008).*

Sakai et al. (Study on a large-scale discrete element model for fine particles in a fluidized bed, 2012, Advanced Powder Technology 23 (2012) 673-681) (Year: 2012).*

Deen et al. (Review of discrete particle modeling of fluidized beds, Chemical Engineering Science 62 (2007) 28-44) (Year: 2007).*

Lu et al. (Assessment of different coarse graining strategies to simulate polydisperse gas-solids flow, Chemical Engineering Science 179 (2018) 53-63) (Year: 2018).*

Queteschiner et al. (Adaptive Coarse-Graining for Large-Scale DEM Simulations, 12th International Conference on CFD in Oil & Gas, Metallurgical and Process Industries, 2017, pp. 1-6) (Year: 2017).*

Kimiaki Washino et al., "Similarity Model for DEM Simulation of Fluidized Bed", Journal of the Society of Powder Technology, Japan, DOI: https://doi.org/10.4164/sptj.44.198, Dec. 2006, pp. 198-205, vol. 44, No. 3, The Society of Powder Technology, Japan.

* cited by examiner

| CATEGORY | DEFINITION | SYMBOL | COARSE GRAINING COEFFICIENT |
|---|---|---|---|
| COARSE GRAINING CONDITION | PARTICLE DIAMETER [m] | $D_p$ | $K$ |
| PHYSICAL PROPERTY | PARTICLE DENSITY [kg/m³] | $\rho_p$ | $1/K\sqrt{K}$ |
| | GAS DENSITY [kg/m³] | $\rho_f$ | $1/K\sqrt{K}$ |
| | PARTICLE MASS [kg] | $m_p$ | $K\sqrt{K}$ |
| | GAS VISCOSITY COEFFICIENT [Pa·s] | $\mu$ | 1 |
| | PARTICLE HEAT CONDUCTIVITY [W/m/k] | $k_p$ | $K$ |
| | PARTICLE SPECIFIC HEAT [J/kg/K] | $c$ | $K\sqrt{K}$ |
| | GAS HEAT CONDUCTIVITY [W/m/k] | $k_f$ | $K$ |
| | GAS LOW-PRESSURE SPECIFIC HEAT [J/kg/K] | $c_{p,f}$ | $K$ |
| PHYSICAL QUANTITY RELATING TO FLOW AND HEAT | PARTICLE SPEED [m/s] | $U$ | $\sqrt{K}$ |
| | GAS FLOW RATE [m/s] | $V$ | $\sqrt{K}$ |
| | MINUMUM FLUIDIZATION VELOCITY [m/s] | $V_{mf}$ | $\sqrt{K}$ |
| | PARTICLE MASS FLOW RATE [kg/s] | $\dot{m}_p$ | $1/K$ |
| | GAS PRESSURE [Pa] | $p$ | $1/K\sqrt{K}$ |
| | VOID RATIO [-] | $\varepsilon$ | 1 |
| | PARTICLE TEMPERATURE [K] | $T_p$ | 1 |
| | GAS TEMPERATURE [K] | $T$ | 1 |
| | SURFACE AREA OF PARTICLE [m²] | $A_s$ | $K^2$ |
| | PARTICLE HEAT TRANSFER COEFFICIENT [W/m²/K] | $h$ | 1 |
| | HEAT TRANSFER AMOUNT ON PARTICLE SURFACE [W] | $\dot{Q}$ | $K^2$ |
| | HEAT FLOW RATE ON PARTICLE SURFACE [W/m²] | $\dot{q}$ | 1 |
| | SENSIBLE HEAT OF ALL PARTICLES [J] | $Q_{p,all}$ | 1 |
| DIMENSIONLESS QUANTITY | PARTICLE REYNOLDS NUMBER [-] | $Re_p$ | 1 |
| | ARCHIMEDES NUMBER [-] | $Ar_p$ | 1 |
| | FROUDE NUMBER [-] | $Fr$ | 1 |
| | PRANDTL NUMBER [-] | $Pr$ | 1 |
| | PARTICLE NUSSELT NUMBER [-] | $Nu_p$ | 1 |
| | BIO NUMBER [-] | $Bi$ | 1 |

SIMULATION APPARATUS, SIMULATION METHOD, AND COMPUTER READABLE MEDIUM STORING PROGRAM

RELATED APPLICATIONS

The content of Japanese Patent Application No. 2018-186520, on the basis of which priority benefits are claimed in an accompanying application data sheet, is in its entirety incorporated herein by reference.

BACKGROUND

Technical Field

Certain embodiment of the present invention relates to a simulation apparatus, a simulation method, and a computer readable medium storing a program.

Description of Related Art

There is a known method of linking a discrete element method (DEM) that analyzes the behavior of a granular material composed of a plurality of particles and a computational fluid dynamics (CFD) that analyzes a flow field of a fluid together to analyze the behavior of a fluidized bed with a solid particle suspended in a fluid (Non-Patent Document 1). The related art discloses a simulation method that prevents a calculation time when the number of particles increases from increasing. Specifically, a process of enlarging the particle to reduce the number of particles (coarse graining) is performed, physical properties or physical quantities are converted such that governing equations are the same before and after the coarse graining, and a simulation is performed on a fluidized bed after the coarse graining.

Non-Patent Document 1

Washino Kimiaki, Hsu Chih-Hung, Kawaguchi Toshihiro, Tsuji Yutaka, "Similarity model in DEM calculation of fluidized bed", Journal of granular material Engineering, Vol. 44, No. 3, 2007, p. 198 to 205

SUMMARY

According to an embodiment of the present invention, there is provided a simulation apparatus including: an input apparatus that performs an input of a simulation condition; an output apparatus that performs an output a simulation result; and a processing apparatus that analyzes behavior of a granular material including a plurality of particles having different sizes based on the simulation condition input from the input apparatus. The processing apparatus obtains the behavior of a coarse grained granular material by a simulation based on a value of a parameter that defines a particle diameter distribution of a granular material to be simulated and a value of a coarse graining coefficient which is a reference for coarse graining of the particles, which are input from the input apparatus, and associates the behavior of the particles obtained by the simulation with the input value of the coarse graining coefficient and outputs the result to the output apparatus.

According to another aspect of the invention, there is provided a simulation method including: determining a distribution of particle diameters of a granular material to be simulated; obtaining a distribution of particle diameters of a granular material after coarse graining based on the distribution of the particle diameters of the granular material to be simulated; and defining a plurality of particles of the granular material after the coarse graining based on the distribution of the particle diameters of the granular material after the coarse graining and simulating behavior of the particles of the granular material after the coarse graining using a discrete element method.

According to yet another aspect of the invention, there is provided a computer readable medium storing a program that causes a computer to execute a process. The process includes a function of acquiring a value of a parameter defining a particle diameter distribution of a granular material to be simulated and a value of a coarse graining coefficient which is a reference for coarse graining of the granular material; a function of simulating behavior of a coarse grained granular material based on the acquired value of the parameter defining the particle diameter distribution and the value of the coarse graining coefficient; and a function of associating the behavior of the particles obtained by the simulation with the acquired value of the coarse graining coefficient and outputting the result.

DETAILED DESCRIPTION

In a simulation method in the related art, an analysis target is a granular material having a uniform particle diameter of a plurality of particles. For example, it is possible to set a granular material that can be regarded to have a substantially uniform particle diameter like an industrial product such as a glass bead as the analysis target. There is no known method of performing the coarse graining for a granular material having non-uniform particle diameters such as a silica sand. Even though the coarse graining is performed on the assumption that a granular material having non-uniform particle diameters has a uniform particle diameter and the granular material after the coarse graining is analyzed, it is impossible to obtain a reasonable result.

There is a need for providing a simulation apparatus, a simulation method, and a computer readable medium storing a program capable of analyzing the behavior of a granular material having non-uniform particle diameters.

Reference Example

Before describing an embodiment of the present invention, a reference example related to the embodiment will be described with reference to FIGS. 1A to 7B.

Figure 1A:
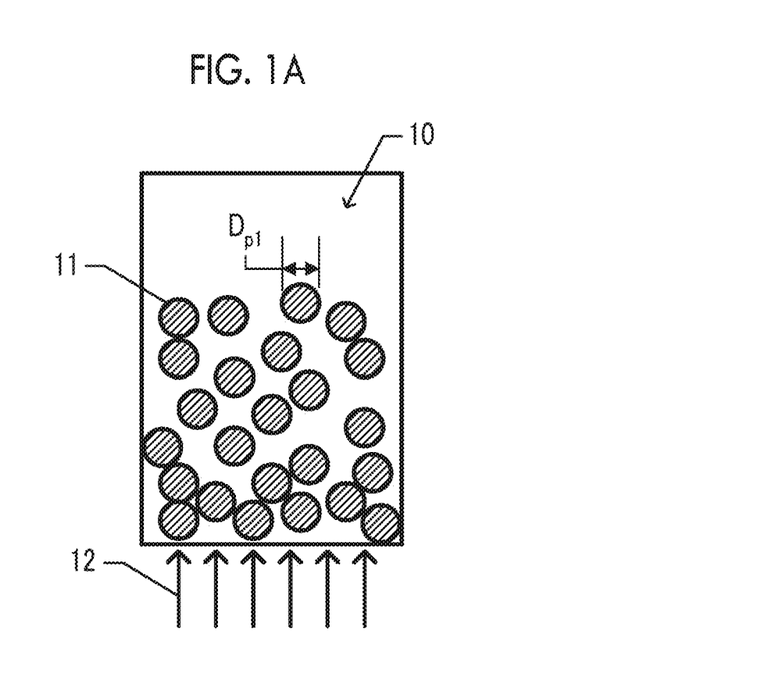
FIG. 1A is a schematic diagram showing an example of a fluidized bed to be simulated according to a reference example.
Figure 1B:
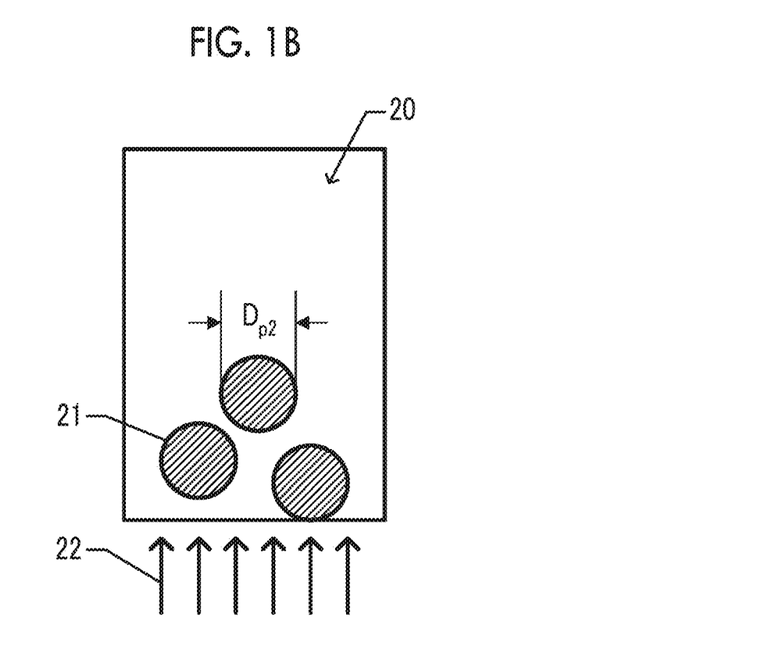
FIG. 1B is a schematic diagram showing an example of a fluidized bed to be simulated after coarse graining.

A simulation method and apparatus according to the reference example will be described with reference to FIGS. 1A to 7B. FIG. 1A is a schematic diagram showing an example of a fluidized bed to be simulated. The behavior of the fluidized bed formed by disposing a plurality of particles 11 in a region 10 to be simulated and introducing a gas 12 into the region 10 from the downward to the upward is simulated. The diameter of the particle 11 is represented by $D_{p1}$. In this reference example, each particle 11 is enlarged and thus the number of particles 11 is reduced (hereinafter referred to as coarse graining) to reduce a calculation load.

FIG. 1B is a schematic diagram showing an example of a fluidized bed to be simulated after the coarse graining. The particle 11 is enlarged to obtain a virtual particle 21. The virtual particle 21 is disposed in a region 20 to be simulated. The dimension of the area 20 after the coarse graining is the same as the dimension of the area 10 before the coarse graining. The diameter of the virtual particle 21 is represented by $D_{p2}$. An enlargement ratio (coarse graining coefficient) K is defined as a ratio of the diameter of the virtual particle 21 after the coarse graining to the diameter of the particle 11 before the coarse graining. An enlargement ratio K is defined by the following equation.

[Formula 1]

$$D_{p2} = K \cdot D_{p1} \tag{1}$$

An analysis by linking computational fluid dynamics (CFD) and discrete element method (DEM) together is performed for the fluidized bed after the coarse graining formed by introducing the gas 22 from the downward to the upward in the region 20 where the particle 21 after the coarse graining is disposed. In the coarse graining, physical properties and various physical quantities of the particle 11 and the gas 12 are converted such that the virtual fluidized bed after the coarse graining and the actual fluidized bed before the coarse graining satisfy a similarity rule.

Next, a conversion rule of the physical properties and various physical quantities of the particle 11 and the gas 12 will be described with reference to FIG. 2.

Figure 2:
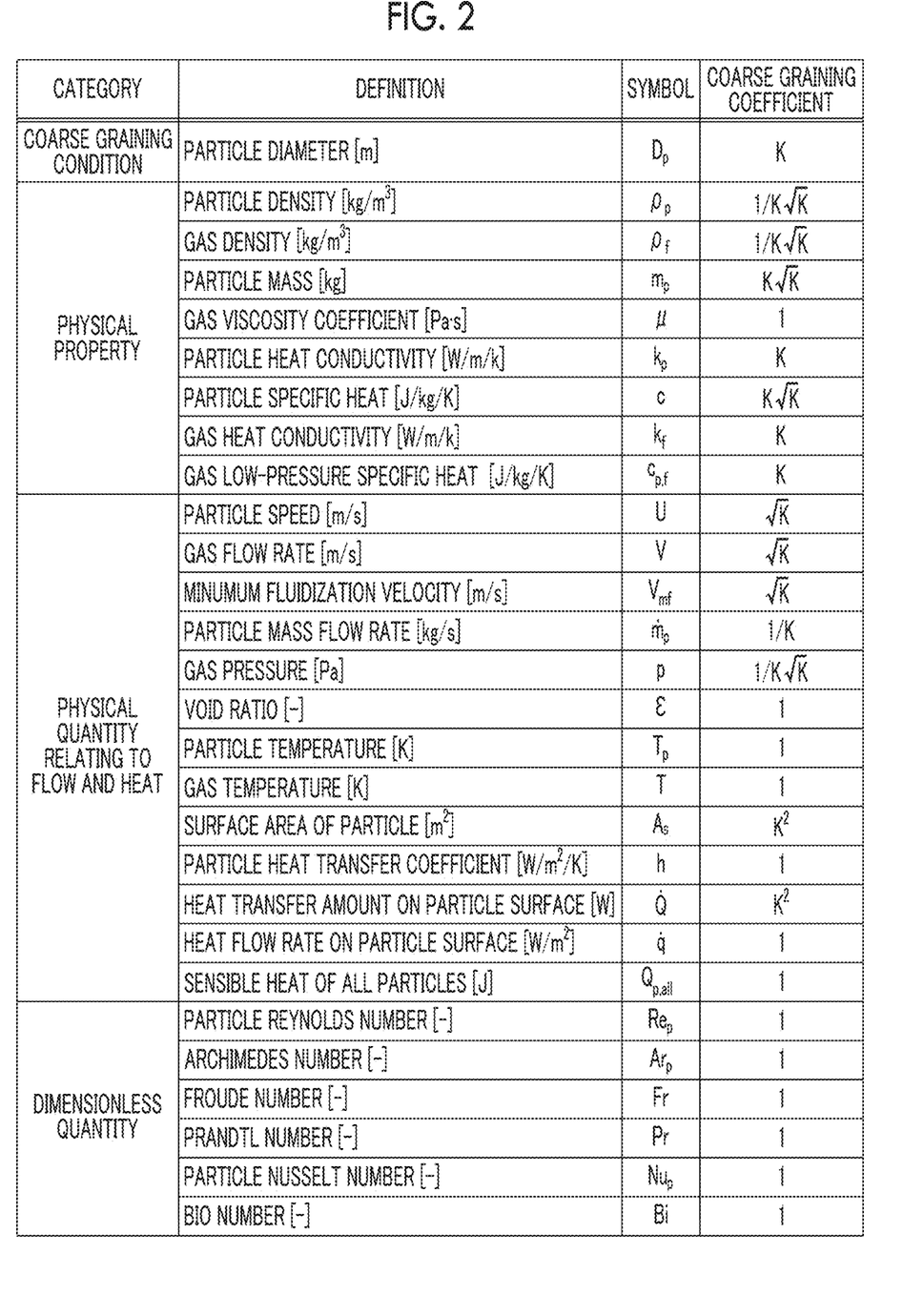
FIG. 2 is a table showing a list of symbols and coarse graining coefficients used in the present specification for physical properties of a particle and a gas and various physical quantities defined relating to the particle and the gas.

FIG. 2 is a table showing a list of symbols and coarse graining coefficients used in the present specification for the physical properties of the particle and the gas and various physical quantities defined relating to the particle and the gas. Actual physical property and physical quantity before the coarse graining are multiplied by the coarse graining coefficient to obtain a physical property and a physical quantity relating to the fluidized bed after the coarse graining. In this specification, for example, a subscript "1" is assigned to the symbols indicating the physical property and the physical quantity before the coarse graining, and a subscript "2" is assigned to the symbols indicating the physical property and the physical quantity after the coarse graining, as shown in equation (1).

Examples of a dimensionless quantity relating to the flow of the fluidized bed include a particle Reynolds number $Re_p$, an Archimedes number $Ar_p$, and a Froude number Fr. These dimensionless quantities are defined by the following equations.

[Formula 2]

$$Re_p = \frac{|V - U|\rho_f \varepsilon D_p}{\mu} \tag{2}$$

$$Ar_p = \frac{D_p^2 \rho_f (\rho_p - \rho_f) g}{\mu^2}$$

$$Fr = \frac{V}{\sqrt{g D_p}}$$

Here, g is a gravitational acceleration. Bold V and U mean a vector. A void ratio ε is defined by the following equation, where M is a total mass of filled particles and $V_A$ is an apparent volume of a region filled with the particles.

[Formula 3]

$$\varepsilon = 1 - \frac{M}{\rho_p V_A} \tag{3}$$

A condition is set that the particle Reynolds number $Re_p$, Archimedes number $Ar_p$, and Froude number Fr, which are the dimensionless quantities relating to the flow of the fluidized bed, do not change before and after the coarse graining. Further, when the conversion rule of the physical property and physical quantity before and after coarse graining is obtained under conditions that the void ratio ε does not change and a gas viscosity coefficient μ does not change, the following conversion rule is obtained.

[Formula 4]

$$\rho_{f2} = \frac{1}{K\sqrt{K}} \rho_{f1} \tag{4}$$

$$\rho_{p2} = \frac{1}{K\sqrt{K}} \rho_{p1}$$

$$V_2 = \sqrt{K} V_1$$

$$U_2 = \sqrt{K} U_1$$

$$V_{mf2} = \sqrt{K} V_{mf1}$$

From the conversion rule of gas density $\rho_{f2}$, the following conversion rule is obtained for a gas pressure p.

[Formula 5]

$$p_2 = \frac{1}{K\sqrt{K}} p_1 \quad (5)$$

Assuming that the apparent volume $V_A$ of the region filled with the particles before and after the coarse graining does not change and the number of particles is reduced to $1/K^3$ by the coarse graining, the following conversion rule is obtained.

[Formula 6]

$$m_{p2} = (K\sqrt{K})m_{p1} \quad (6)$$

The particle mass flow rate $m_p$ dot is defined by the following equation, where A is a channel area.

[Formula 7]

$$\dot{m}_p = \rho_p U A \quad (7)$$

From this equation, the following conversion rule is derived.

[Formula 8]

$$\dot{m}_{p2} = \frac{1}{K}\dot{m}_{p1} \quad (8)$$

Further, a condition is set that the dimensionless quantity relating to heat transport also does not change before and after the coarse graining. Examples of the dimensionless quantity relating to the heat transport are Prandtl number Pr, particle Nusselt number $Nu_p$, and bio number Bi. The Prandtl number Pr, the particle Nusselt number $Nu_p$, and the bio number Bi are defined by the following equation.

[Formula 9]

$$Pr = \frac{\mu c_{p,f}}{k_f}$$

$$Nu_p = \frac{h D_p}{k_f} \quad (9)$$

$$Bi = \frac{h L_p}{k_p}$$

Here, $L_p$ is a characteristic length of the particle and can be defined by $L_p = D_p/6$.

In order to simplify temperature dependence of the physical property, it is assumed that a particle temperature $T_p$ and a gas temperature T do not change before and after the coarse graining. Further, it is assumed that a particle heat transfer coefficient h also does not change before and after the coarse graining. Under this assumption, the following conversion rule is obtained.

[Formula 10]

$$k_{p2} = K \cdot k_{p1}$$

$$k_{f2} = K \cdot k_{f1}$$

$$c_{p,f2} = K \cdot c_{p,f1} \quad (10)$$

The conversion rule of particle specific heat c cannot be determined only by the above assumption. In this reference example, in order to determine the conversion rule of the particle specific heat c, an assumption is introduced that sensible heat $Q_{p,all}$ of all particles does not change before and after the coarse graining. The sensible heat $Q_{p,all}$ of all particles is defined by the following equation, where $N_p$ is the number of particles and $\Delta T_p$ is a difference between an initial temperature of the particles and the gas temperature T introduced into the fluidized bed.

[Formula 11]

$$Q_{p,all} = N_p m_p c \Delta T_p \quad (11)$$

The number of particles $N_p$ is reduced to approximately $1/K^3$ by the coarse graining. Therefore, when the sensible heat $Q_{p,all}$ of all particle is assumed to be unchanged before and after the coarse graining, the following conversion rule is obtained.

[Formula 12]

$$c_2 = (K\sqrt{K})c_1 \quad (12)$$

A heat transfer amount Q dot on a particle surface is defined by the following equation.

[Formula 13]

$$\dot{Q} = hA_s(T - T_p) \quad (13)$$

From this definition, the following conversion rule is obtained for the heat transfer amount Q dot.

[Formula 14]

$$\dot{Q}_2 = K^2 \dot{Q}_1 \quad (14)$$

The following conversion rule is obtained for heat flux q dot on the particle surface.

[Formula 15]

$$\dot{q}_2 = \dot{q}_1 \quad (15)$$

Figure 3:
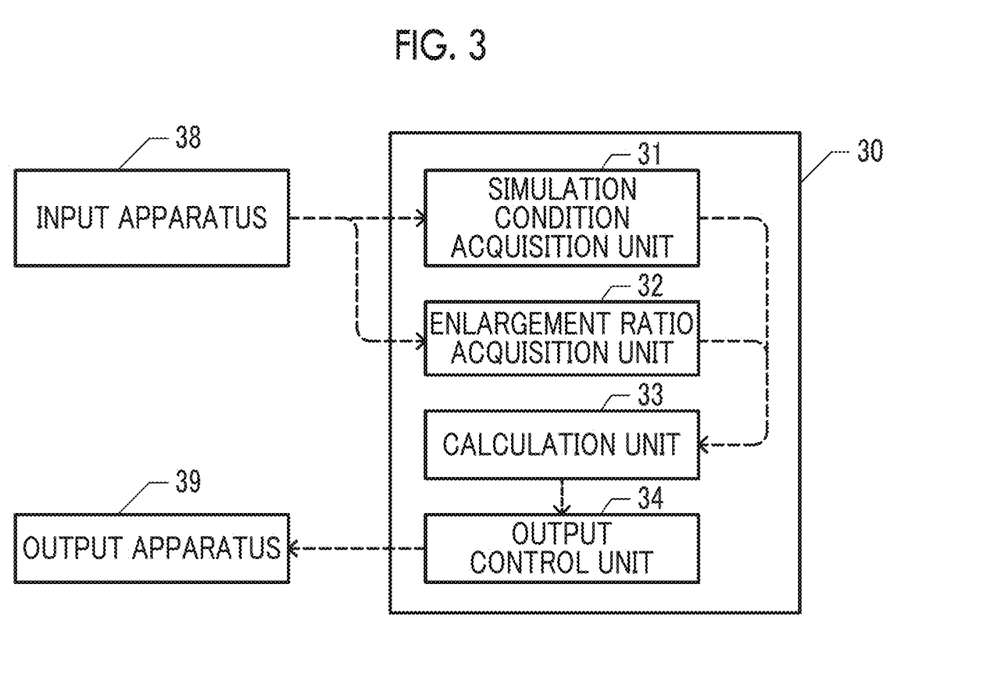
FIG. 3 is a block diagram of a simulation apparatus according to the present reference example.

FIG. 3 is a block diagram of a simulation apparatus according to this reference example. The simulation apparatus according to this reference example includes a processing apparatus 30, an input apparatus 38, and an output apparatus 39. The processing apparatus 30 includes a simulation condition acquisition unit 31, an enlargement ratio acquisition unit 32, a calculation unit 33, and an output control unit 34.

Each block shown in FIG. 3 can be formed by an element or a mechanical apparatus such as a central processing unit (CPU) of a computer in hardware and can be formed by a computer program or the like in software. FIG. 3 shows functional blocks realized by cooperation of hardware and software. Therefore, these functional blocks can be realized in various manners by a combination of the hardware and the software.

The processing apparatus 30 is connected to the input apparatus 38 and the output apparatus 39. The input apparatus 38 receives inputs of a command from a user and data related to processing executed by the processing apparatus 30. The input apparatus 38 can be, for example, a keyboard or a mouse performing the input by a user operation, a communication apparatus performing the input through a network such as the Internet, a reading apparatus performing the input from a recording medium such as a CD or a DVD, or the like.

The simulation condition acquisition unit 31 acquires a simulation condition through the input apparatus 38. The simulation condition includes various pieces of information necessary for the simulation. For example, an initial condition, a boundary condition, and the like of physical properties of the particle to be simulated and the gas and physical quantities relating to the particle and the gas are included. The enlargement ratio acquisition unit 32 acquires the enlargement ratio K (FIG. 2) through the input apparatus 38.

The calculation unit 33 multiplies the physical property and the physical quantity before the coarse graining by the coarse graining coefficient (FIG. 2) based on the simulation condition and the enlargement ratio K to obtain an initial condition of the physical quantities and the physical properties of the particle and the gas after the coarse graining. The simulation of the fluidized bed by linking the CFD and the DEM together is performed based on the initial condition of the physical quantities and the physical properties after the coarse graining.

The output control unit 34 outputs a simulation result to the output apparatus 39. For example, a variation in a position and temperature of the particle and a variation in a temperature distribution of the gas are displayed graphically on a display screen of the output apparatus 39.

Figure 4:
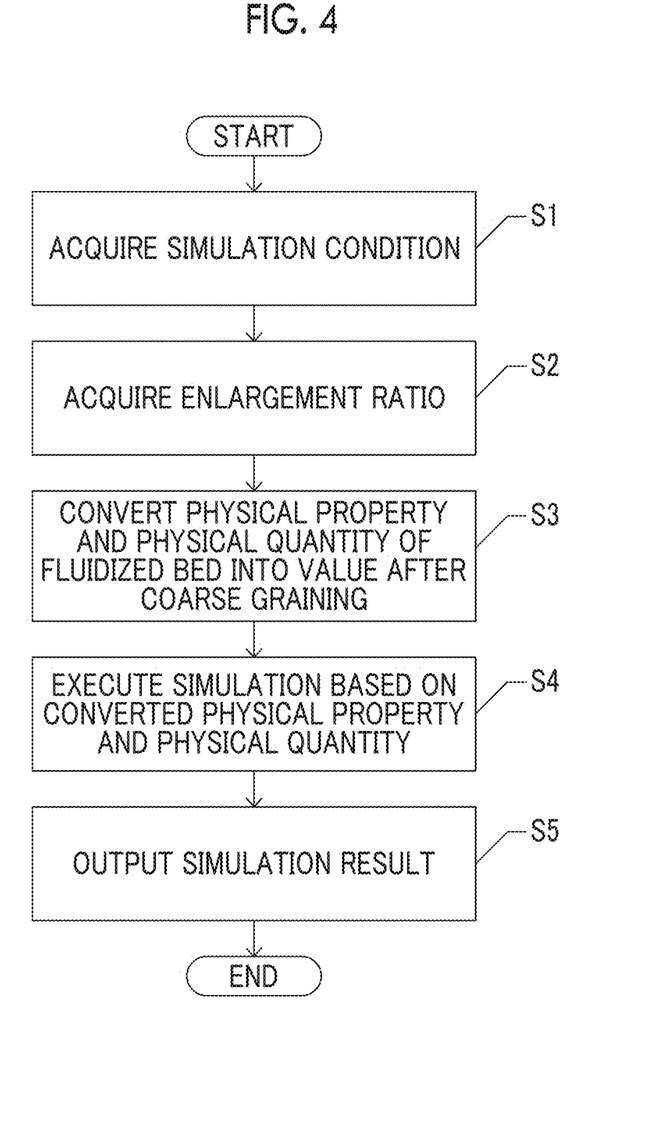
FIG. 4 is a flowchart of a simulation method according to the present reference example.

FIG. 4 is a flowchart of a simulation method according to this reference example. First, the simulation condition acquisition unit 31 (FIG. 3) acquires the simulation condition (step S1), and the enlargement ratio acquisition unit 32 (FIG. 3) acquires the enlargement ratio K (FIG. 2) (step S2).

Thereafter, the calculation unit 33 (FIG. 3) converts initial values of the physical properties and the physical quantities input as the simulation condition into values after the coarse graining (step S3). Further, the simulation is executed based on the converted physical properties and physical quantities (step S4). When the simulation ends, the output control unit 34 (FIG. 3) outputs the simulation result (step S5).

Next, the result of actually performing the simulation using the simulation method according to the present reference example will be described with reference to FIGS. 5 to 7B. A target of this simulation is the same as that described in Non-Patent Document 1.

Figure 5:
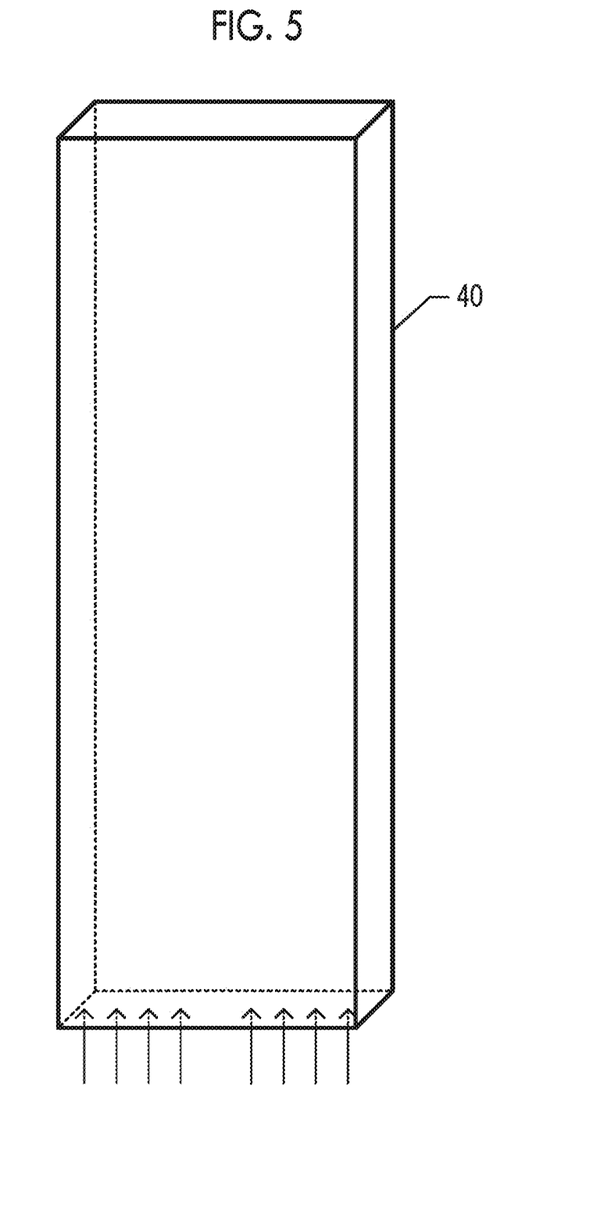
FIG. 5 is a perspective view of a simulation region of a simulation actually performed using the method according to the reference example.

FIG. 5 is a perspective view of a simulation region 40. The simulation region 40 is a rectangular parallelepiped having a width of 8 cm, a thickness of 1.5 cm, and a height of 25 cm. The simulation region 40 is filled with a plurality of glass particles having a diameter of 1 mm, and a gas is introduced into the simulation region 40 from the bottom surface of the simulation region 40. Particle density $\rho_p$ is 2500 kg/m$^3$. The particle specific heat c is 840 J/kg/K, gas constant pressure specific heat $c_{p,f}$ is 1010 J/kg/K, and the gas viscosity coefficient μ is 2.0×10$^{-5}$ Pa·s. The total mass of the particles to be filled in the simulation region 40 is 75 g. A gas having a temperature lower than the initial temperature of the particle is introduced into the simulation region 40. The simulation is performed when a flow rate of the gas is 1.20 m/s (when the flow rate is slow) and when the rate is 1.54 m/s (when the flow rate is fast).

The simulation is performed for two of the fluidized bed coarse grained with the enlargement ratio K of 2 and the original fluidized bed.

Figure 6:
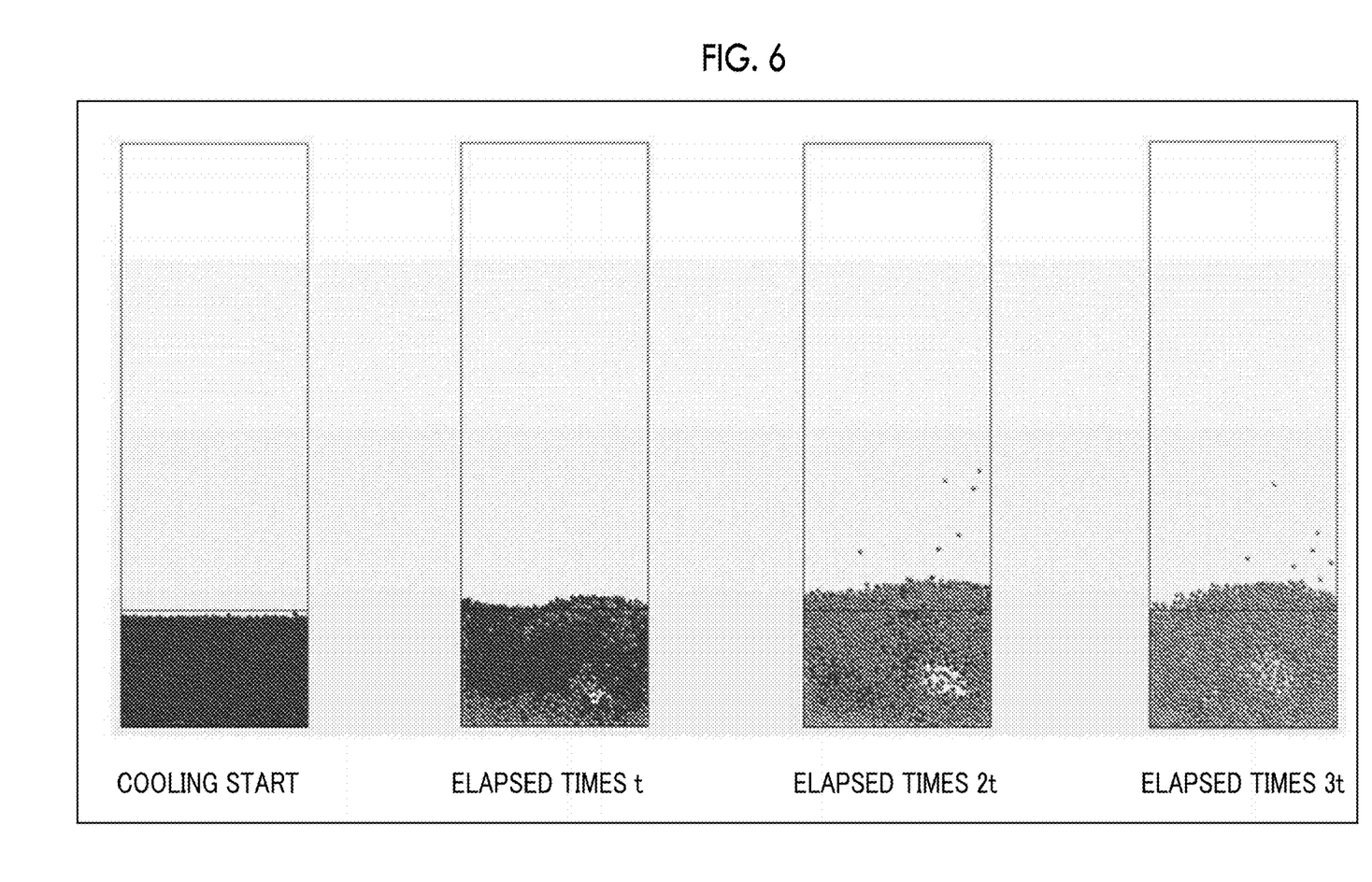
FIG. 6 is a diagram showing, in a time series, simulation results of positions and temperatures of coarse grained particles in a coarse grained fluidized bed.

FIG. 6 is a diagram showing, in a time series, positions and temperatures of the coarse grained particles obtained by the simulation of the coarse grained fluidized bed. The first, second, third, and fourth diagrams from the left of FIG. 6 show states of the fluidized bed at a cooling start timepoint, elapsed times t, 2t, and 3t from the cooling start, respectively. The denseness of each particle represents the temperature of the particle, and the particle is represented densely as the temperature is higher. It can be understood that the particles flow due to the inflow of the gas and the temperature of the particles decreases with time.

Figure 7A:
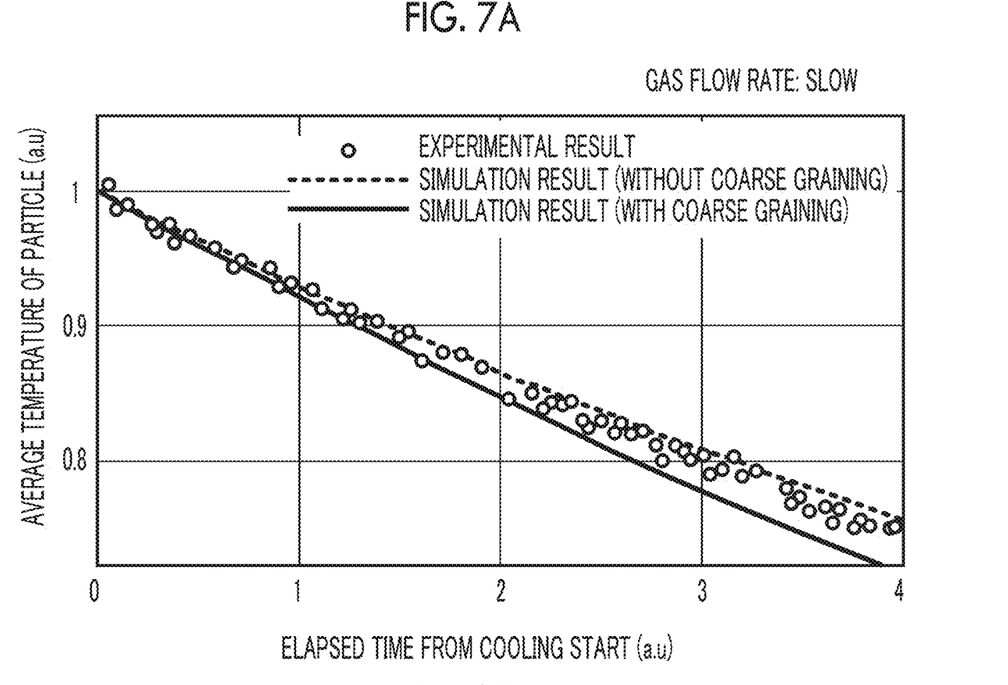
FIGS. 7A and 7B are graphs showing temporal changes in an average temperature of the particle obtained from the simulation results of the method according to the reference example.
Figure 7B:
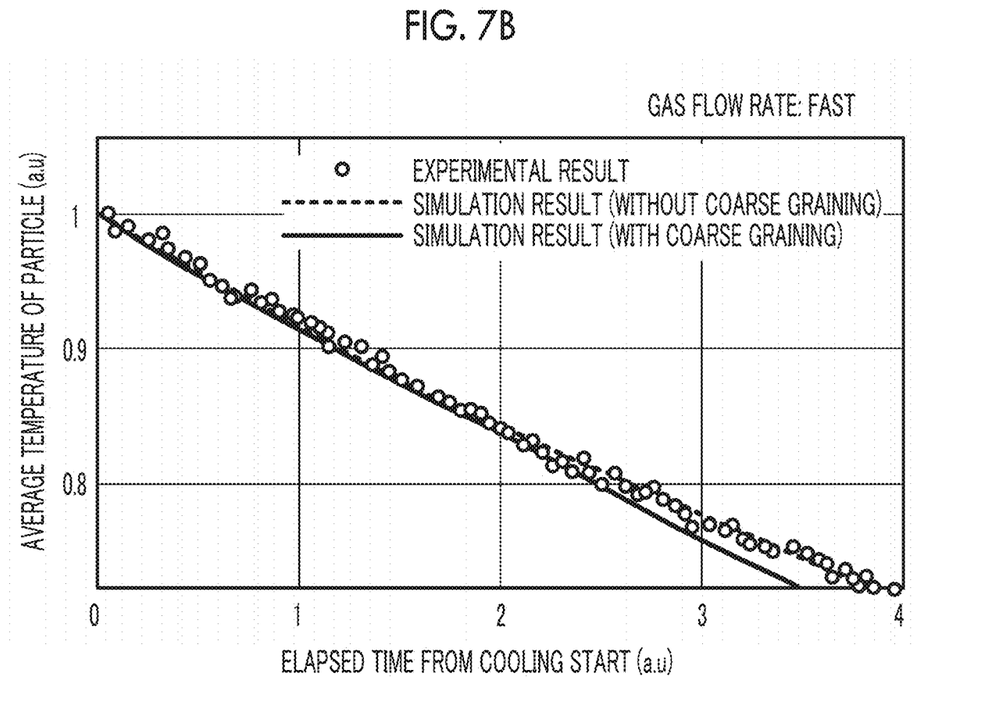

FIGS. 7A and 7B are graphs showing temporal changes in an average temperature of the particle obtained from the simulation results. The horizontal axis represents the elapsed time from the cooling start in a random unit, and the vertical axis represents the average temperature of the particle as a relative value with the initial temperature as the reference. FIG. 7A shows a case where the gas flow rate is slow, and FIG. 7B shows a case where the gas flow rate is fast. The broken line in the graph indicates the simulation result of the fluidized bed before the coarse graining, and the solid line indicates the simulation result of the fluidized bed after the coarse graining. For reference, the temperature change of the particle according to experimental results shown in Non-Patent Document 1 is indicated by a circle symbol.

From the simulation results shown in FIGS. 7A and 7B, it can be confirmed that the simulation results are in good agreement with the experimental results even though the simulation is performed with the coarse graining by the method according to this reference example. It can also be confirmed that when the gas flow rate is increased, the temperature of the particle decreases rapidly. As described above, the coarse graining method according to the present reference example can be applied to the simulation of the behavior of the fluidized bed with the temperature change.

Embodiment

Next, a simulation apparatus and a simulation method according to an embodiment will be described with reference to FIGS. 8 to 11.

In the reference example described above, the particle diameters of the plurality of particles constituting the fluidized bed are assumed to be uniform. In the embodiment described below, a granular material composed of a plurality of particles having different particle diameters is set as a simulation target. In the above reference example, the simulation of the fluidized bed is performed by linking the discrete element method (DEM) that analyzes the behavior of the granular material and the computational fluid dynamics (CFD) that analyzes the flow field of the fluid together. However, in the embodiment described below, the behavior of the granular material is analyzed using the discrete element method without being linked with the computational fluid dynamics. The analysis method using the discrete element method described in the following embodiment can be applied to the analysis of the fluidized bed.

A Rosin-Rammler distribution is widely used as a method of representing the distribution of the particle diameters of the granular material. A Rosin-Rammler distribution $Q_1$ is represented by the following equation.

[Formula 16]

$$Q_1(d_{p1}) = 1 - \exp\left\{-\left(\frac{d_{p1}}{d_{e1}}\right)^{n_1}\right\} \qquad (16)$$

Here, $d_{p1}$ represents the particle diameter of the particle of the granular material. $Q(d_{p1})$ is a ratio (mass fraction) of the mass of particles having a particle diameter $d_{p1}$ or less to the total mass. $d_{e1}$ is a parameter having a length dimension (hereinafter referred to as a reference particle diameter parameter), and $n_1$ is an exponential parameter. The exponential parameter $n_1$ represents a degree of spread of the distribution. In order to determine a range of the particle diameter distribution, a minimum particle diameter $d_{p1,min}$ and a maximum particle diameter $d_{p1,max}$ are defined. When the particle diameter $d_{p1}$ is determined, the mass fraction of particles having the particle diameter $d_{p1}$ or less is obtained from the distribution of equation (16).

The particle diameter of the particle of the granular material after the coarse graining is represented by $d_{p2}$, the reference particle diameter parameter of the Rosin-Rammler distribution applied to the granular material after the coarse graining is represented by $d_{e2}$, and the exponential parameter thereof is represented by $n_2$. A Rosin-Rammler distribution $Q_2$ applied to the granular material after the coarse graining is represented by the following equation.

[Formula 17]

$$Q_2(d_{p2}) = 1 - \exp\left\{-\left(\frac{d_{p2}}{d_{e2}}\right)^{n_2}\right\} \quad (17)$$

Values obtained by multiplying values before the coarse graining by a coarse graining coefficient are used as the reference particle diameter parameter $d_{e2}$, a minimum particle diameter $d_{p2,min}$, and a maximum particle diameter $d_{p2,max}$ of the Rosin-Rammler distribution after the coarse graining, and the value before the coarse graining is used as the exponential parameter $n_2$ thereof. When the coarse graining coefficient is represented by K, the conversion rule for the coarse graining is represented by the following equation.

[Formula 18]

$$d_{e2} = K \cdot d_{e1}$$

$$d_{p2,min} = K \cdot d_{p1,min}$$

$$d_{p2,max} = K \cdot d_{p1,max}$$

$$n_2 = n_1 \quad (18)$$

Substituting equation (18) into equation (17) yields the following equation.

[Formula 19]

$$Q_2(d_{p2}) = 1 - \exp\left\{-\left(\frac{d_{p2}}{K \cdot d_{e1}}\right)^{n_1}\right\} \quad (19)$$

The parameters $d_{e1}$, $d_{p1,min}$, $d_{p1,max}$, and $n_1$ relating to the granular material before the coarse graining can be determined by examining the distribution of the particle diameters of the granular material to be simulated. Therefore, the Rosin-Rammler distribution of equation (19) is determined as the particle diameter distribution of the particles after the coarse graining. When the behavior of the granular material after the coarse graining is simulated, the distribution of equation (19) may be used.

Figure 8:
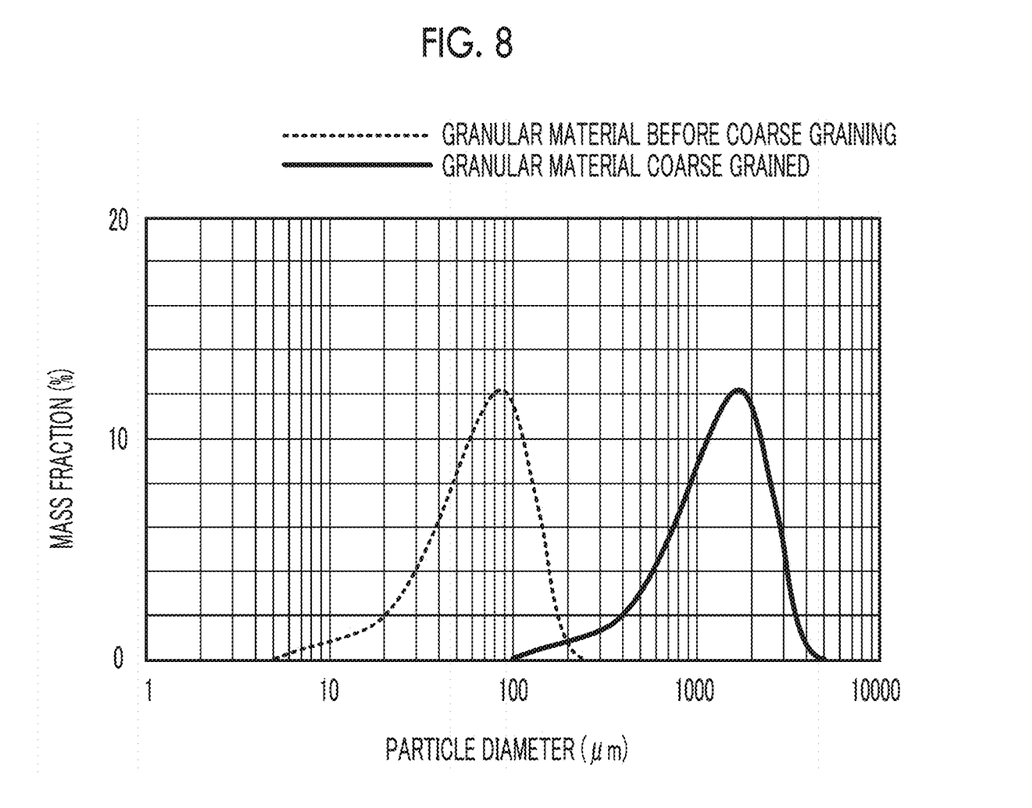
FIG. 8 is a graph showing an example of a mass fraction of particle diameters of the granular material before and after the coarse graining.

FIG. 8 is a graph showing an example of the mass fraction of the particle diameter of the granular material before and after the coarse graining. The horizontal axis represents the particle diameter in a logarithmic scale in a unit "μm", and the vertical axis represents the mass fraction of particle included in a certain particle diameter range in a unit "%". The broken line and the solid line in the graph of FIG. 8 respectively indicate the particle diameter distributions of the granular material before coarse graining and the granular material after coarse graining. The graph shown in FIG. 8 corresponds to a Rosin-Rammler distribution differentiated by the particle diameter. The graph showing the particle diameter distribution after the coarse graining is equivalent to a graph showing the particle diameter distribution before the coarse graining translated on the logarithmic scale.

The conversion rule shown in FIG. 2 is used as a conversion rule for the density of the particles of the granular material. That is, when the density of the particles of the granular material before the coarse graining is represented by $\rho_{p1}$ and the density of the particles of the granular material after the coarse graining is represented by $\rho_{p2}$, the conversion rule is represented by the following equation.

[Formula 20]

$$\rho_{p2} = \frac{1}{K\sqrt{k}}\rho_{p1} \quad (20)$$

Figure 9:
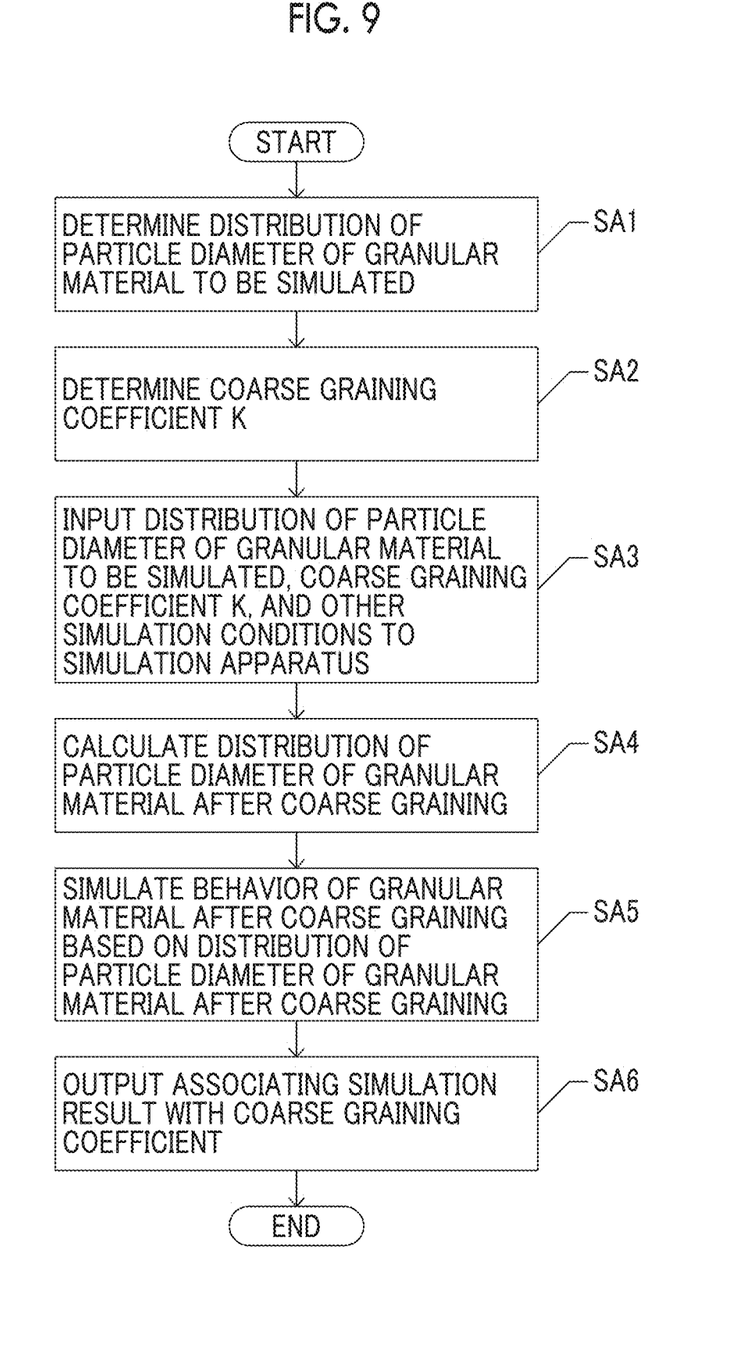
FIG. 9 is a flowchart of a simulation method using a simulation apparatus according to an embodiment.

Next, the simulation method according to the embodiment will be described with reference to FIG. 9. FIG. 9 is a flowchart of the simulation method using the simulation apparatus according to the embodiment. As illustrated in FIG. 3, the simulation apparatus includes the processing apparatus 30, the input apparatus 38, and the output apparatus 39.

First, the distribution of the particle diameters of the granular material to be simulated is determined (step SA1). For the measurement of the particle diameter distribution, for example, an imaging method, a sieving method, a sedimentation method, a light diffraction method or the like can be used. Based on the measured particle diameter distribution, it is possible to determine the reference particle diameter parameter $d_{e1}$ and the exponential parameter $n_1$ of the Rosin-Rammler distribution. Further, it is possible to determine the minimum particle diameter $d_{p1,min}$ and the maximum particle diameter $d_{p1,max}$.

After the distribution of the particle diameters is determined, the coarse graining coefficient K is determined (step SA2). The coarse graining coefficient K may be determined based on the number of particles of the granular material to be simulated, a processing speed of a computer used for the simulation, and the like.

Once the coarse graining coefficient K is determined, the distribution of the particle diameters of the granular material to be simulated (that is, the reference particle diameter parameter $d_{e1}$ and the exponential parameter $n_1$), the coarse graining coefficient K, and other simulation conditions are input to the simulation apparatus by operating the input apparatus 38 (FIG. 3) of the simulation apparatus (step SA3). Other simulation conditions include, for example, the density of the particle, the minimum particle diameter $d_{p1,min}$, the maximum particle diameter $d_{p1,max}$, the initial condition, the boundary condition, the external force acting on the particle, an analysis end condition, and the like.

When these simulation conditions are input, the processing apparatus 30 (FIG. 3) calculates the distribution of the particle diameters of the granular material after the coarse graining. Specifically, equation (18) is applied to determine the reference particle diameter parameter $d_{e1}$, exponential parameter $n_2$, minimum particle diameter $d_{p2,min}$, maximum particle diameter $d_{p2,max}$, and the like of the Rosin-Rammler distribution applied to the granular material after the coarse graining. Further, equation (20) is applied to calculate the density of the particle after the coarse graining.

The processing apparatus 30 simulates the behavior of the granular material after the coarse graining using the discrete element method based on the Rosin-Rammler distribution applied to the granular material after the coarse graining (step SA5). For example, the size of the plurality of particles of the granular material after the coarse graining is defined. Further, an initial state of the particle after the coarse graining is determined based on the input initial condition. Thereafter, the behavior of the particles from this initial state is analyzed.

When a calculation of the simulation ends, the processing apparatus 30 associates the simulation result with the coarse graining coefficient K and outputs the result to the output apparatus 39 (FIG. 3). For example, as shown in FIG. 6, the position of the coarse grained particle is displayed as an image in a time series, and the value of the coarse graining coefficient K is displayed numerically in the display screen. In the image displaying the position of the particle, at least one of hue, saturation, and brightness may be made different according to the particle diameters of the particles of the granular material after the coarse graining.

Next, the result of actually performing the simulation by the method according to the embodiment will be described with reference to FIGS. 10A to 10C. In this simulation, a cylinder is adopted as the initial filling region, and the behavior of the granular material when the granular material is naturally dropped on a horizontal flat surface is obtained. The simulation is performed on a granular material before the coarse graining, a granular material coarse grained with a coarse graining coefficient K=20, and a granular material coarse grained with a coarse graining coefficient K=30. The reference particle diameter parameter $d_{e1}$=0.1181 mm, exponential parameter $n_1$=2.321, minimum particle diameter $d_{p1,min}$=0.05 mm, and maximum particle diameter $d_{p1,max}$=0.2 mm of the Rosin-Rammler distribution representing the particle diameter distribution of the granular material before the coarse graining are set.

In a case where the simulation is actually performed with the coarse graining, the number of particles in the granular material decreases due to the coarse graining. However, in this simulation, the diameter and height of the initial filling region are changed according to the coarse graining coefficient K such that the number of particles is substantially equal before and after the coarse graining. Specifically, the initial filling region of the granular material before the coarse graining is a cylinder having a radius of 3 mm and a height of 5 mm. The initial filling region of the granular material having the coarse graining coefficient K=20 is a cylinder having a radius of 60 mm and a height of 100 mm. The initial filling region of the granular material having the coarse graining coefficient K=30 is a cylinder having a radius of 90 mm and a height of 150 mm.

Figure 10A:
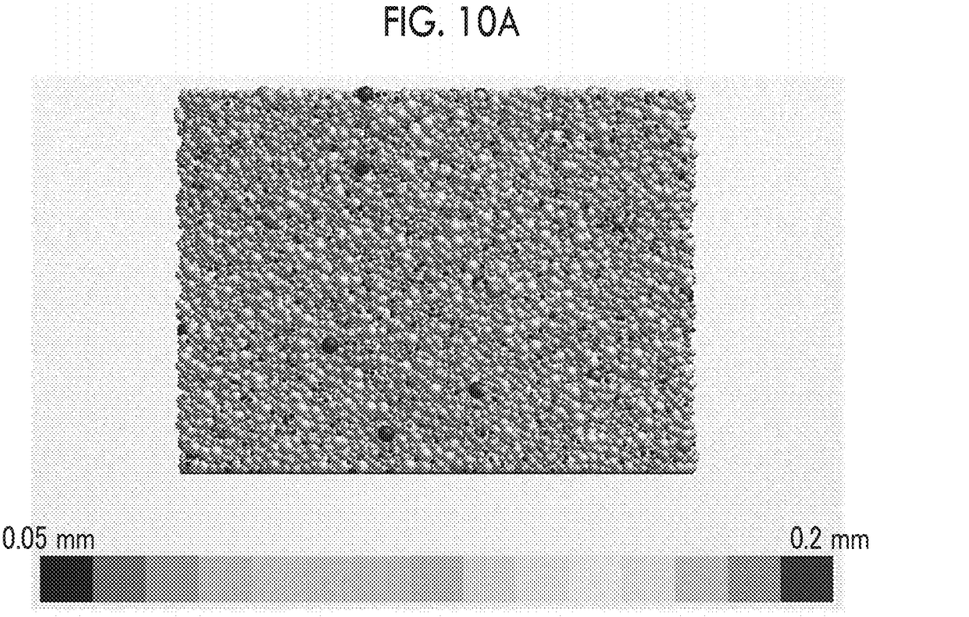
FIG. 10A is a side view of the granular material filled in an initial filling region.

FIG. 10A is a side view of the granular material before the coarse graining in a state where the initial filling region is filled. In FIG. 10A, the brightness of each particle is shown differently depending on the size of the particle.

Figure 10B:
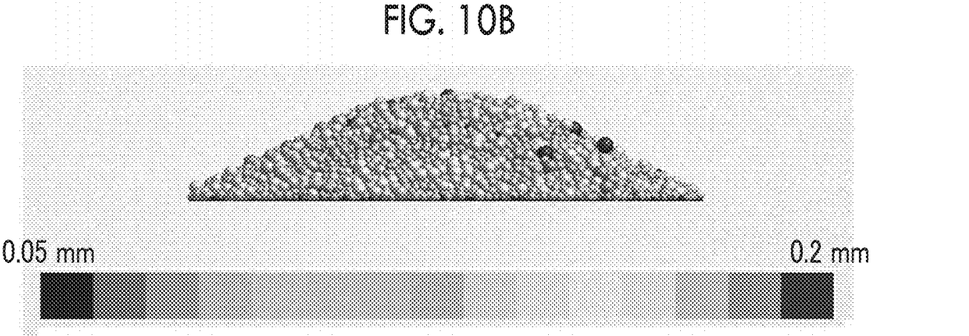
FIGS. 10B and 10C are views of distributions of a granular material before the coarse graining and a granular material coarse grained with a coarse graining coefficient K=30 after a sufficient time elapses, respectively.
Figure 10C:
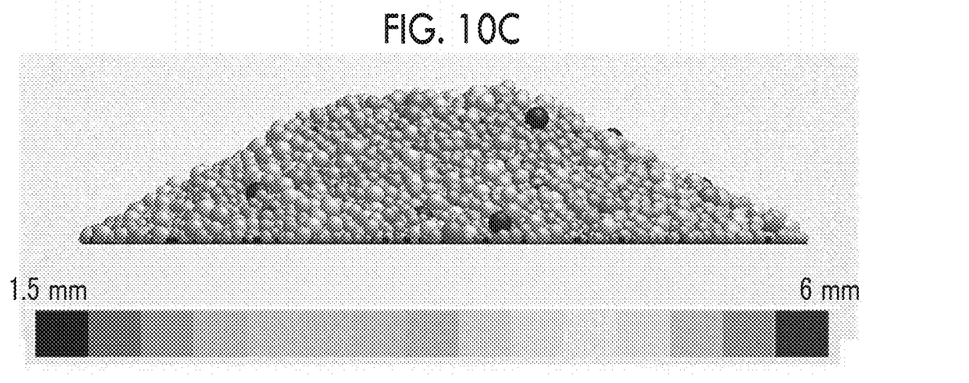

FIG. 10B and FIG. 10C are views of distributions of the granular material before the coarse graining and the granular material coarse grained with the coarse graining coefficient K=30 after a sufficient time elapses, respectively. The granular material in the initial state naturally drops and thus a pile of granular material is formed on the horizontal surface. In FIGS. 10B and 10C, the brightness of each particle is also shown differently depending on the size of the particle similar to FIG. 10A. FIG. 10B and FIG. 10C are different in scale. FIG. 10B represents a relatively large scale compared with FIG. 10C.

A repose angle is obtained from the distribution of the granular material shown in FIGS. 10B and 10C. The repose angle of the pile composed of the granular material before the coarse graining (FIG. 10B) is 27.9°, and the repose angle of the pile composed of the granular material (FIG. 10C) coarse grained with the coarse graining coefficient K=30 is 29.1°. The repose angle of the pile composed of the granular material coarse grained with the coarse graining coefficient K=20 is 28.7°. As described above, the repose angles obtained by simulation for the granular materials before and after the coarse graining are substantially equal. From this simulation result, it is confirmed that the coarse graining method according to the embodiment can be applied to the simulation of the behavior of the granular material having non-uniform particle diameters.

Figure 11:
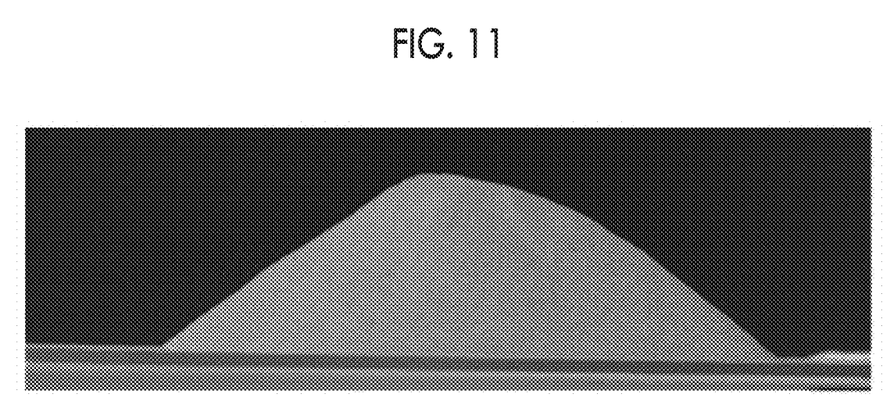
FIG. 11 is a photograph of a pile of silica sands actually formed by naturally dropping the silica sands having non-uniform particle diameters.

FIG. 11 is a photograph of a pile of silica sands actually formed by naturally dropping the silica sands having non-uniform particle diameters. A repose angle obtained by simulating a coarse grained granular material composed of the silica sands is substantially equal to an actual measurement result of repose angle of the pile of silica sands. This evaluation experiment also confirms that the coarse graining technique according to the above embodiment is effective.

Next, a modification example of the above embodiment will be described. In the examples shown in FIGS. 10A to 10C described above, the behavior of the granular material when the granular material is naturally dropped is actually simulated. In addition, the coarse graining method according to the above embodiment can be applied to the simulation of the granular material in various apparatuses in which the behavior of a granular material composed of a plurality of solid particles is important, such as a screw feeder, a coke oven, a bag filter, and a fluidized bed apparatus.

In the above embodiment, the conversion rule for the density shown in equation (20) is used as the conversion rule of the physical property of the particle due to the coarse graining, but another conversion rule may be used as the conversion rule of the physical property of the particle.

The above embodiment is an example, and the present invention is not limited to the above embodiment. For example, it will be apparent to those skilled in the art that various changes, improvements, combinations, and the like can be made.

It should be understood that the invention is not limited to the above-described embodiment, but may be modified into various forms on the basis of the spirit of the invention. Additionally, the modifications are included in the scope of the invention.

What is claimed is:

1. A simulation apparatus comprising:
    an input apparatus that performs an input of a simulation condition;
    an output apparatus that performs an output of a simulation result; and
    a processing apparatus that analyzes behavior of a granular material including a plurality of particles having different sizes based on the simulation condition input from the input apparatus,
    wherein the processing apparatus obtains the behavior of a coarse grained granular material by a simulation based on a value of a parameter that defines a particle diameter distribution of a granular material to be simulated and a value of a coarse graining coefficient which is a reference for coarse graining of the particles, which are input from the input apparatus, and associates the behavior of the particles obtained by the simulation with the input value of the coarse graining coefficient and outputs the result to the output apparatus, wherein the parameters defining the particle diameter distribution are a parameter having a length dimension and an exponential parameter of a Rosin-Rammler distribution representing a distribution of particle diameters of a granular material, and wherein, when the input value of the coarse graining coefficient is K, the processing apparatus sets the particle diameters of the plurality of coarse grained particles based on the Rosin-Rammler distribution using a value of K times the input value as the parameter having the length dimension and using the same value as the input value as the exponential parameter and simulates the behavior of the coarse grained granular material using a discrete element method.

2. The simulation apparatus according to claim 1, wherein the processing apparatus makes at least one of hue, saturation, and brightness different according to particle diameters of the particles of the granular material after the coarse graining and displays the behavior of the particles obtained by the simulation on the output apparatus.

3. A simulation method comprising:

determining a distribution of particle diameters of a granular material to be simulated;

obtaining a distribution of particle diameters of a granular material after coarse graining based on the distribution of the particle diameters of the granular material to be simulated; and defining a plurality of particles of the granular material after the coarse graining based on the distribution of the particle diameters of the granular material after the coarse graining and simulating behavior of the particles of the granular material after the coarse graining using a discrete element method, wherein the distribution of the particle diameters of the granular material after the coarse graining is obtained by determining a value of a parameter having a length dimension and a value of an exponential parameter of a Rosin-Rammler distribution, defining the distribution of the particle diameters of the granular material to be simulated, and by determining a value of a parameter having a length dimension and a value of an exponential parameter of a Rosin-Rammler distribution, defining the distribution of the particle diameters of the granular material after the coarse graining, based on the determined values, and wherein, when a value of a coarse graining coefficient when the granular material to be simulated is coarse grained is K, a value of K times the value of the parameter having the length dimension and the same value as the exponential parameter of the Rosin-Rammler distribution, defining the distribution of the particle diameters of the granular material to be simulated, are used as the parameter having the length dimension and the exponential parameter of the Rosin-Rammler distribution, defining the distribution of the particle diameters of the granular material after the coarse graining.

4. A non-transitory computer storage medium storing a program that causes a computer to execute a process, the process comprising:

acquiring a value of a parameter defining a particle diameter distribution of a granular material to be simulated and a value of a coarse graining coefficient which is a reference for coarse graining of the granular material;

simulating behavior of a coarse grained granular material based on the acquired value of the parameter defining the particle diameter distribution and the value of the coarse graining coefficient; and associating the behavior of the particles obtained by the simulation with the acquired value of the coarse graining coefficient and outputting the result, wherein the parameters defining the particle diameter distribution are a parameter having a length dimension and an exponential parameter of a Rosin-Rammler distribution representing a distribution of particle diameters of a granular material, and wherein, when the acquired value of the coarse graining coefficient is K, the computer sets the particle diameters of the plurality of coarse grained particles based on the Rosin-Rammler distribution using a value of K times the acquired value as the parameter having the length dimension and using the same value as the acquired value as the exponential parameter and simulates the behavior of the coarse grained granular material using a discrete element method.

* * * * *